(12) United States Patent
Chang

(10) Patent No.: US 8,515,705 B2
(45) Date of Patent: Aug. 20, 2013

(54) METHOD AND SYSTEM FOR TESTING CIRCUIT BOARD OF KEYS

(75) Inventor: Pei-Ming Chang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 350 days.

(21) Appl. No.: 13/009,692

(22) Filed: Jan. 19, 2011

(65) Prior Publication Data
US 2012/0136607 A1 May 31, 2012

(30) Foreign Application Priority Data
Nov. 26, 2010 (TW) .............................. 99140953 A

(51) Int. Cl.
*G06F 19/00* (2011.01)

(52) U.S. Cl.
USPC ............ 702/108; 702/35; 702/118; 702/120; 345/163; 345/168; 345/160; 345/173; 707/752; 714/726

(58) Field of Classification Search
USPC ................... 702/35, 108, 118, 119, 120, 182; 345/163, 168, 158, 159, 160, 157, 213, 173, 345/175; 706/47; 707/694, 752, 758; 714/726, 714/729
See application file for complete search history.

(56) References Cited

U.S. PATENT DOCUMENTS

| | | | | | |
|---|---|---|---|---|---|
| 5,019,806 | A | * | 5/1991 | Raskin et al. ................. | 345/160 |
| 5,367,472 | A | * | 11/1994 | Khashayar ..................... | 702/119 |
| 5,426,450 | A | * | 6/1995 | Drumm ......................... | 345/168 |
| 5,501,518 | A | * | 3/1996 | Woodward ..................... | 702/120 |
| 5,707,160 | A | * | 1/1998 | Bowen .......................... | 400/472 |
| 5,785,439 | A | * | 7/1998 | Bowen .......................... | 400/472 |
| 5,936,614 | A | * | 8/1999 | An et al. ....................... | 345/173 |
| 6,100,875 | A | * | 8/2000 | Goodman et al. ............. | 345/163 |
| 6,330,514 | B1 | * | 12/2001 | Kuo ............................... | 702/35 |

* cited by examiner

*Primary Examiner* — Carol S Tsai
(74) *Attorney, Agent, or Firm* — Kirton McConkie; Evan R. Witt

(57) ABSTRACT

A circuit board testing system and a circuit board testing system for testing a circuit board of keys. The circuit board testing system includes a computer and a test frame. The circuit board is placed on the test frame. The computer includes a script database with plural pin test scripts, a script generation program and a test program. The test program is used for searching a pin test script corresponding to the circuit board from the script database, and testing the circuit board according to the pin test script. If the pin test script is not searched from the script database by the test program, the script generation program is activated to create the pin test script.

15 Claims, 15 Drawing Sheets

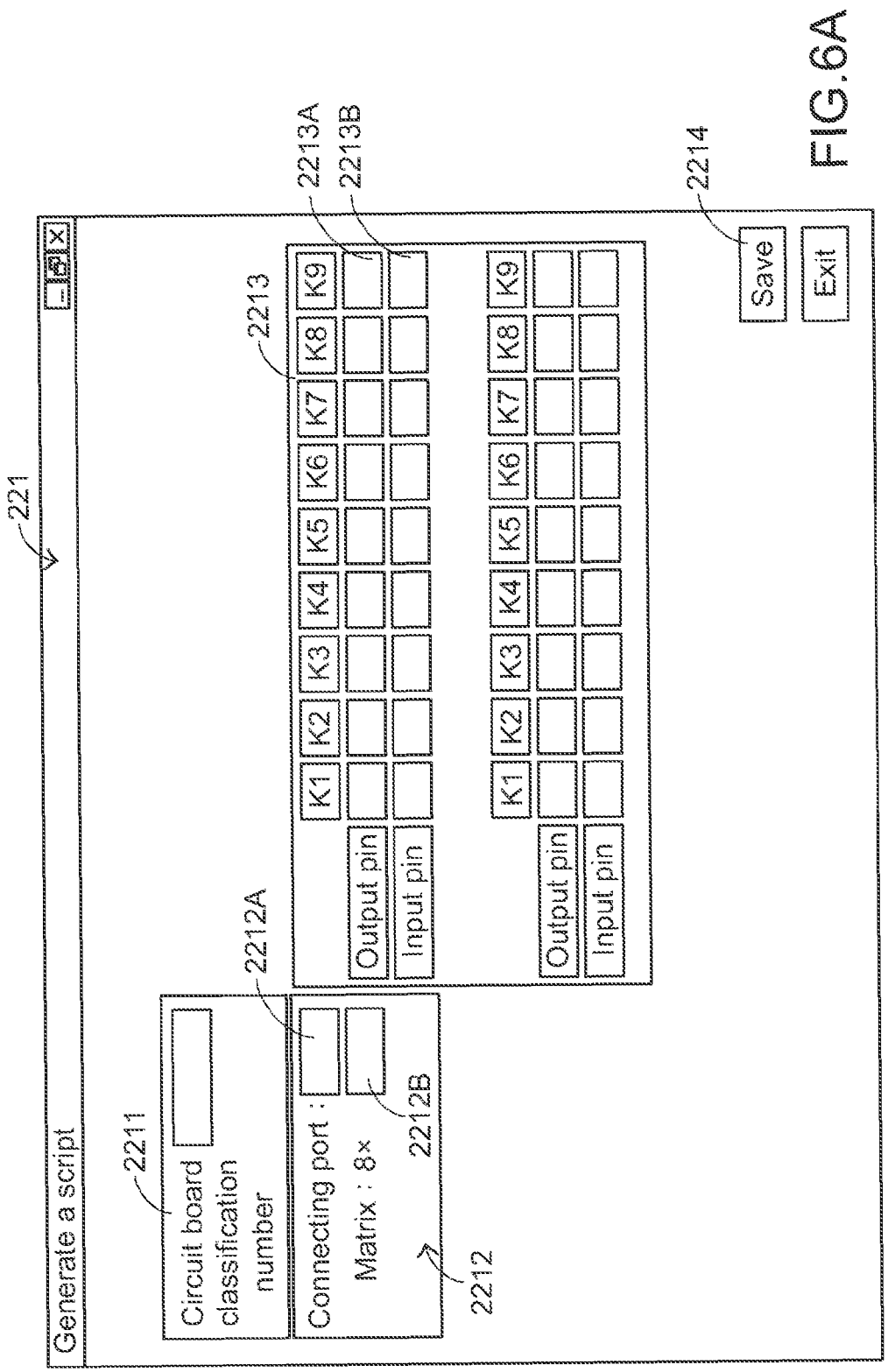

FIG.6B

Generate a script

Circuit board classification number: 12345-1

Connecting port: 1
Matrix: 8× -18

2211
2212A
2212
2212B

| Output pin | K1 | K2 | K3 | K4 | K5 | K6 | K7 | K8 | K9 |
| Input pin | B0 | B1 | B2 | B3 | B4 | B5 | B6 | B7 | B8/ |
| | A7 | A6 | A5 | A4 | A3 | A2 | A1 | A0 | A7 |

| Output pin | K1 | K2 | K3 | K4 | K5 | K6 | K7 | K8 | K9 |
| Input pin | B8 | B10 | B11 | B12 | B13 | B14 | B15 | B16 | B17 |
| | A6 | A5 | A4 | A3 | A2 | A1 | A0 | A7 | A6 |

2213
2213A
2213B

Save    Exit 2214
221

FIG.7C

Test a circuit board

Circuit board classification number: 12345-1

Connecting port: 1
Matrix: 8×  18

Matched circuit board

| K1 | K2 | K3 | K4 | K5 | K6 | K7 | K8 | K9 |
|----|----|----|----|----|----|----|----|----|
|    | K10| K11| K12| K13| K14| K15| K16| K17| K18|

| Total intersection | Tested intersection | Untested intersection | | |
|---|---|---|---|---|
| 18 | 1 | 17 | | |
| Tested amount | Acceptance amount | Defective amount | Yield | |
| 0 | 0 | 0 | 0 | |

19 KeyDown 69
19 KeyUp 69

Exit

METHOD AND SYSTEM FOR TESTING CIRCUIT BOARD OF KEYS

FIELD OF THE INVENTION

The present invention relates to a method and a system for testing a circuit board of keys, and more particularly to a method and a system for testing a circuit board of keys of an input device.

BACKGROUND OF THE INVENTION

With rapid development of electronic and information industries, computers and the peripheral device thereof become essential parts in our daily lives. In addition to the working purposes, computers can be employed as amusement tools. In the computer systems, input devices play important roles for communicating the computer with the user. The common input devices of the computer systems include for example mice, keyboards or trackballs.

As know, keyboards have the most keys among the common input devices. Hereinafter, the configurations of a conventional keyboard will be illustrated with reference to FIG. 1. FIG. 1 is a schematic view illustrating the outward appearance of a conventional keyboard. There are plural keys mounted on the surface of the keyboard 1. These keys include for example ordinary keys 10, numeric keys 11 and function keys 12. When one or more keys are depressed by the user, a corresponding signal is issued to the computer, and thus the computer executes a function corresponding to the depressed key or keys. For example, when the ordinary keys 10 are depressed, corresponding English letters or symbols are inputted into the computer system. In addition, the function keys 12 (F1~F12) can be programmed to cause corresponding application programs to provide certain functions.

Generally, in the fabricating process of the keyboard, a testing method should be performed to realize whether the functions of the keyboard are normal or not. The testing method includes a step of testing the circuit board of the keyboard and a step of testing the overall functions of the assembled keyboard. By testing the circuit board, the manufacturer may realize whether any defects are present in the circuit board. If the step of testing the circuit board is eliminated, after the keyboard device is assembled and some defects are found, the keyboard needs to be disassembled to debug the circuit board. It is troublesome and time-consuming to disassemble the keyboard device and debug the circuit board.

Hereinafter, the internal circuitry of a conventional keyboard will be illustrated with reference to FIG. 2. FIG. 2 is a schematic circuit diagram illustrating the internal circuitry of a conventional keyboard. The keyboard 1 includes a circuit board (not shown), a microprocessor 13 and a keyboard scanning matrix 14. The microprocessor 13 is connected with the keyboard scanning matrix 14. The other parts of the microprocessor 13 are known in the art, and are not redundantly described herein. In addition, the keyboard scanning matrix 14 comprises plural scan input lines X0~X7 and plural scan output lines Y0~Y17, which crisscross with each other. The scan input lines X0~X7 have respective first terminals connected with the microprocessor 13. In addition, the scan input lines X0~X7 have respective second terminals connected with corresponding input pins (not shown) of the circuit board. The scan output lines Y0~Y17 have respective first terminals connected with the microprocessor 13. In addition, the scan output lines Y0~Y17 have respective second terminals connected with corresponding output pins (not shown) of the circuit board. Since the keyboard scanning matrix 14 includes 8 scan input lines (X0~X7) and 18 scan output lines (Y0~Y17), the keyboard scanning matrix 14 is an 8×18 scanning matrix. Each scan input line and each scan output line crisscross to define an intersection. In other words, the keyboard scanning matrix 14 has a total of 144 intersections correlating with 144 keys on the surface of the keyboard device 1. That is, in a case that the keyboard 1 has 144 keys, the internal circuitry of keyboard 1 should at least comprise 8 scan input lines and 18 scan output lines.

Hereinafter, a conventional method of testing the circuit board of the keyboard will be illustrated with reference to FIG. 2. After the circuit board of the keyboard is produced, the circuit board is connected with a testing module. The testing module includes 26 switches and 26 light emitting diodes (LEDs). These 26 switches are respectively connected with the input pins corresponding to the scan input lines X0~X7 and the output pins corresponding to the scan output lines Y0~Y17. These 26 light emitting diodes correspond to the 26 switches. Then, these 26 switches are manually depressed one by one. If the light emitting diode connected with the depressed switch illuminates, it means that the input pin or the output pin corresponding to the depressed switch passes the test. On the other hand, if the light emitting diode connected with the depressed switch does not illuminate, it means that the function of the input pin or the output pin corresponding to the depressed switch is abnormal. In other words, the operator may judge whether the function of the circuit board is normal according to the illuminating statuses of the light emitting diodes.

Although the convention method for testing the circuit board is simple, there are still some drawbacks. For example, it is time-consuming and labor-intensive to successively depress the switches. Since too many keys need to be manually tested, the operator may repeatedly depress the same keys or forget to depress some keys. Under this circumstance, the testing method should be performed again, so that manual testing method is ineffective and costly.

For solving the above problems, an automatic testing system for testing the circuit board of the keyboard. In this circuit board testing system, a pin test script specifically applied to a circuit board with a certain scanning matrix format (e.g. an 8×18 scanning matrix format) has been previously written. According to the pin test script, a test program is executed to test the circuit board. In such way, the possibility of erroneously depressing the switches by the manual testing method will be minimized. However, this circuit board testing system is only applied to the circuit board with the certain scanning matrix format (e.g. the 8×18 scanning matrix format). For testing the circuit board with another scanning matrix format (e.g. an 8×16 scanning matrix format), the original pin test script of this circuit board testing system should be modified, or another pin test script specifically applied to the circuit board with the 8×16 scanning matrix format should be written.

Moreover, the pin settings of the circuit board to be tested by the circuit board testing system should be defined. For example, the intersection corresponding to the first input pin and the first output pin is defined as the key A. If the pins settings of a circuit board to be tested do not comply with the specifications of the pin test script of this circuit board testing system, the original pin test script should be modified in order to test the circuit board.

Therefore, there is a need of providing a circuit board testing system for testing circuit boards with various scanning matrix formats and testing circuit boards with various pin settings.

SUMMARY OF THE INVENTION

The present invention provides a circuit board testing method and a circuit board testing system applied to various circuit boards with different scanning matrix formats.

The present invention also provides a circuit board testing method and a circuit board testing system applied to various circuit boards with different pin settings.

In accordance with an aspect of the present invention, there is provided a circuit board testing method for testing a circuit board of keys. The circuit board includes plural input pins and plural output pins. The circuit board issues a key code corresponding to a triggered input pin and a triggered output pin. The circuit board testing method includes the following steps. Firstly, a script database is provided. Then, a circuit board information corresponding to a standard circuit board is received, and a pin test script corresponding to the circuit board classification number is searched from the script database. If the pin test script is not successfully searched, a tested pin information corresponding to the standard circuit board is received, and the pin test script is generated according to the circuit board information and the tested pin information. Afterwards, the plural input pins and the plural output pins of the circuit board corresponding to the tested pin information are tested according to the pin test script.

In an embodiment, the step of testing the plural input pins and the plural output pins of the circuit board corresponding to the tested pin information comprises sub-steps of triggering the plural input pins and the plural output pins according to plural input pin numbers and plural output pin numbers of the tested pin information, so that plural key codes are correspondingly outputted from the plural input pins and the plural output pins; and judging whether the plural key codes are the same as corresponding standard key codes of the tested pin information.

In an embodiment, if the plural key codes are different from the plural standard key codes, the circuit board is considered as a failed circuit board. Whereas, if the plural key codes are identical to the plural standard key codes, the circuit board is considered as a qualified circuit board.

In an embodiment, the circuit board information includes a circuit board classification number, a connecting port number and a scanning matrix format. The key code is a scan code. The circuit board is installed in an input device with a PS2 (Personal System/2) interface. The input device is a keyboard, a mouse or a trackball.

In an embodiment, the pin test script is searched from the script database according to a circuit board classification number of the circuit board information, and the script database is stored in a computer.

In an embodiment, if the pin test script is not successfully searched, the circuit board testing method further includes a step of receiving a connecting port number and a scanning matrix format of the circuit board information.

In accordance with another aspect of the present invention, there is provided a circuit board testing system for testing a circuit board of keys. The circuit board includes plural input pins and plural output pins. The circuit board issues a key code corresponding to the triggered input pin and the triggered output pin. The circuit board testing system includes a computer and a test frame. The computer includes a script database, a script generation program and a test program. The script database is stored in the computer. The script generation program is installed in the computer for generating a pin test script, and storing the pin test script in the script database. The test program is installed in the computer for generating a test signal corresponding to the pin test script according to the pin test script, thereby testing the circuit board. The test frame is connected with the computer for supporting the circuit board, generating a simulating key signal according to the test signal, and triggering the plural input pins and the plural output pins corresponding to the simulating signal, so that the plural key codes corresponding to the plural input pins and the plural output pins are outputted from the circuit board to the test program of the computer. By comparing the plural key codes with plural standard key codes of the pin test script, the test program judges whether the circuit board is a qualified circuit board.

In an embodiment, the pin test script further includes a circuit board information and a tested pin information. The tested pin information comprises plural input pin numbers, plural output pin numbers and the plural standard key codes.

In an embodiment, the circuit board information includes a circuit board classification number, a connecting port number and a scanning matrix format. The key code is a scan code. The circuit board is installed in an input device with a PS2 (Personal System/2) interface. The input device is a keyboard, a mouse or a trackball.

In an embodiment, the circuit board information includes a circuit board classification number, a connecting port number, a scanning matrix format, a product ID (PID), a vendor ID (VID) and an input device classification number. The key code is a scan code. The circuit board is installed in an input device with a USB (universal series bus) interface. The input device is a keyboard, a mouse or a trackball.

In an embodiment, if the plural key codes are different from the plural standard key codes, the circuit board is considered as a failed circuit board. Whereas, if the plural key codes are identical to the plural standard key codes, the circuit board is considered as a qualified circuit board.

In an embodiment, the circuit board testing system further includes a monitor, which is connected with the computer for showing a script generation interface of the script generation program and a test interface of the test program. The pin test script is created through the script generation interface.

In an embodiment, the script generation interface includes a circuit board information field, a connecting port setting field and a tested pin setting field, and the test interface includes a test circuit board information field, a test connecting port field, a searching field, a tested intersection field, a test intersection number field, a test display field and a test status field.

In an embodiment, the test frame includes a controlling unit, an analog switch, a power wire, a first signal wire and a second signal wire. The controlling unit is electrically connected with the circuit board for generating the simulating key signal according to the test signal. The analog switch is electrically connected with the controlling unit and the circuit board for receiving the simulating key signal, and triggering the plural input pins and the plural output pins of the circuit board corresponding to the simulating signal. The power wire is connected with the computer for transmitting electricity from the computer to the test frame. The first signal wire is connected with the computer for transmitting the test signal from the computer to the test frame. The second signal wire is connected with the computer for transmitting the plural key codes to the test program of the computer.

In an embodiment, the power wire and the second signal wire are USB connecting wires, and the first signal wire is a RS232 connecting wire.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 6A and 6B schematically illustrate the contents of the script generation interface of the circuit board testing system according to the first embodiment of the present invention;

FIGS. 7A, 7B, 7C, 7D and 7E schematically illustrate the contents of the test interface of the circuit board testing system according to the first embodiment of the present invention; and FIG. 8 schematically illustrates the script generation interface of the circuit board testing system according to the second embodiment of the present invention.

DETAILED DESCRIPTION OF THE PREFERRED EMBODIMENT

Figure 1:
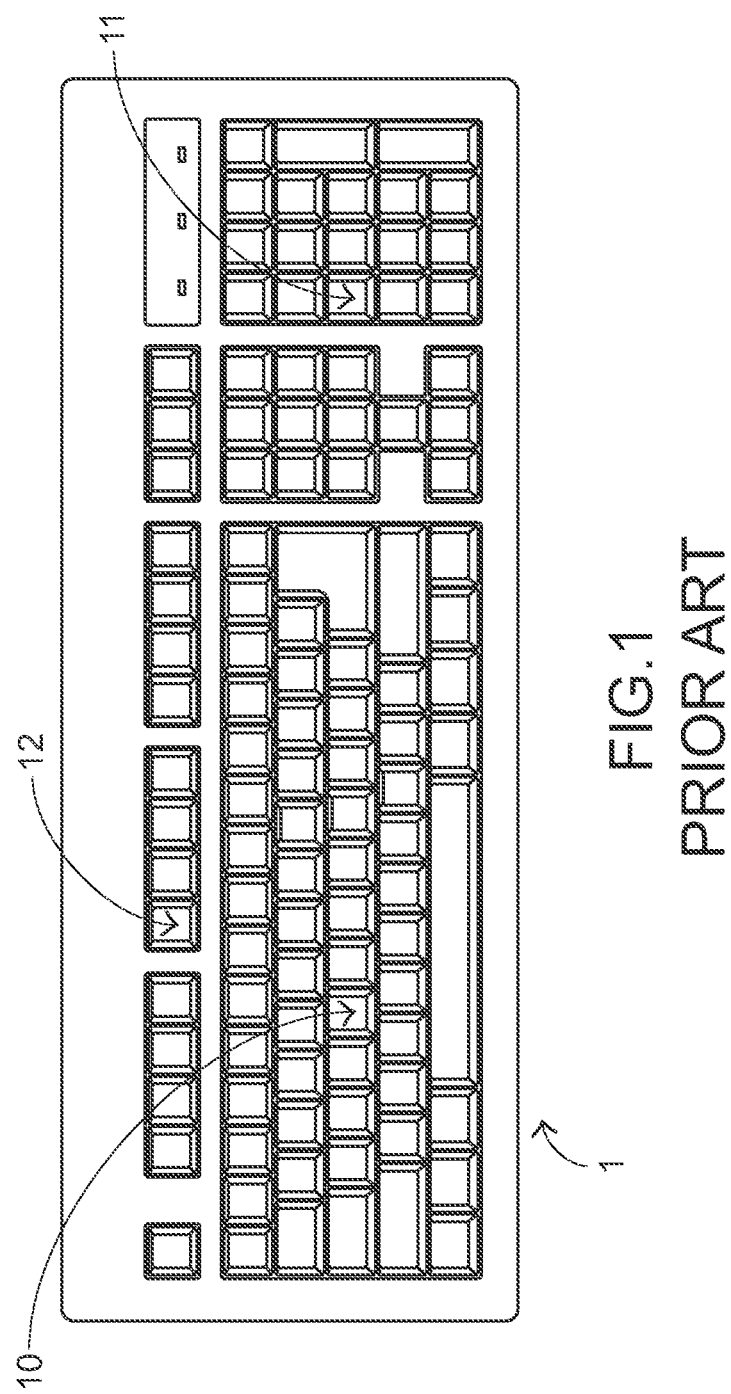
FIG. 1 is a schematic view illustrating the outward appearance of a conventional keyboard.
Figure 2:
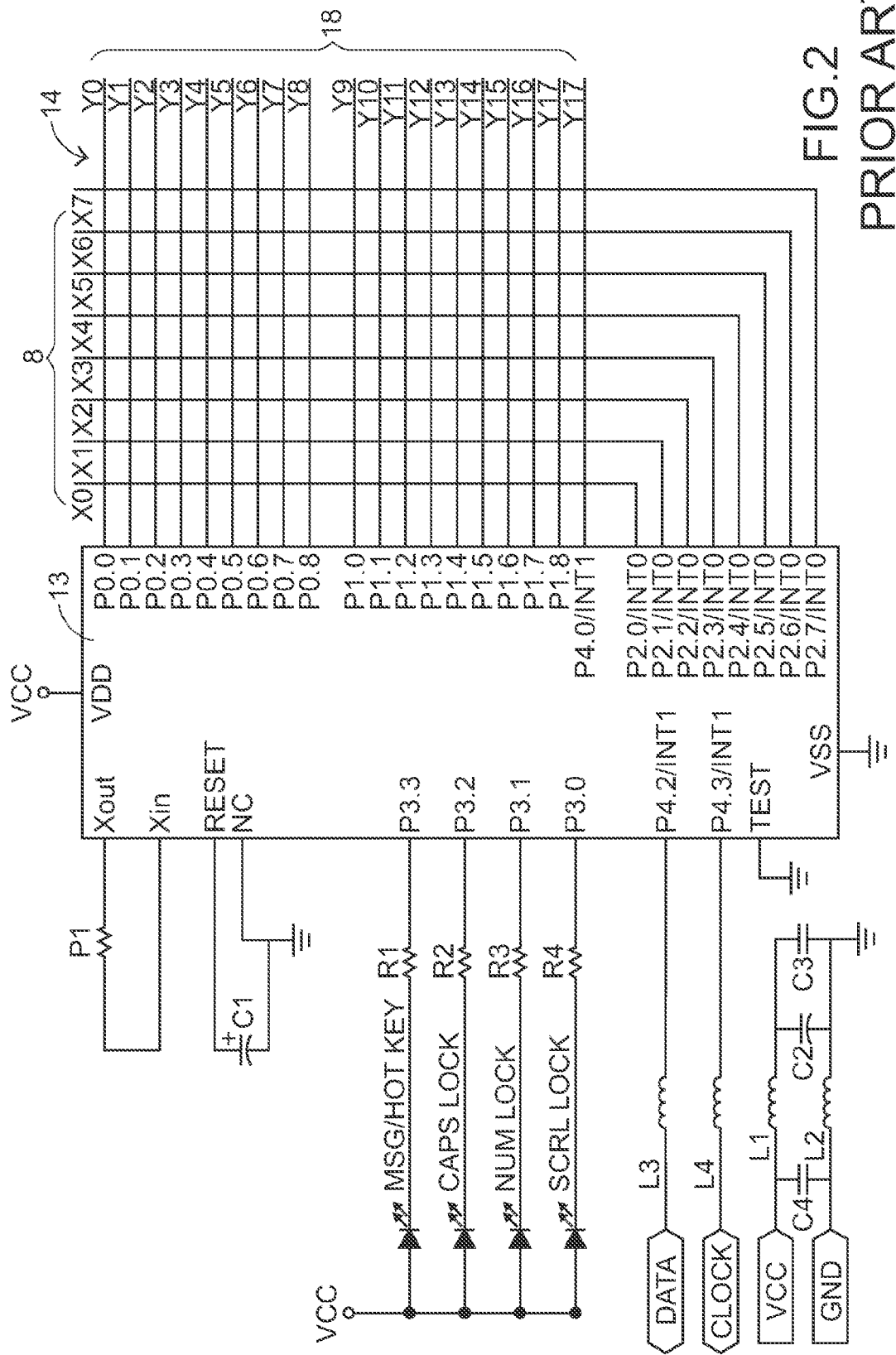
FIG. 2 is a schematic circuit diagram illustrating the internal circuitry of a conventional keyboard.
Figure 3A:
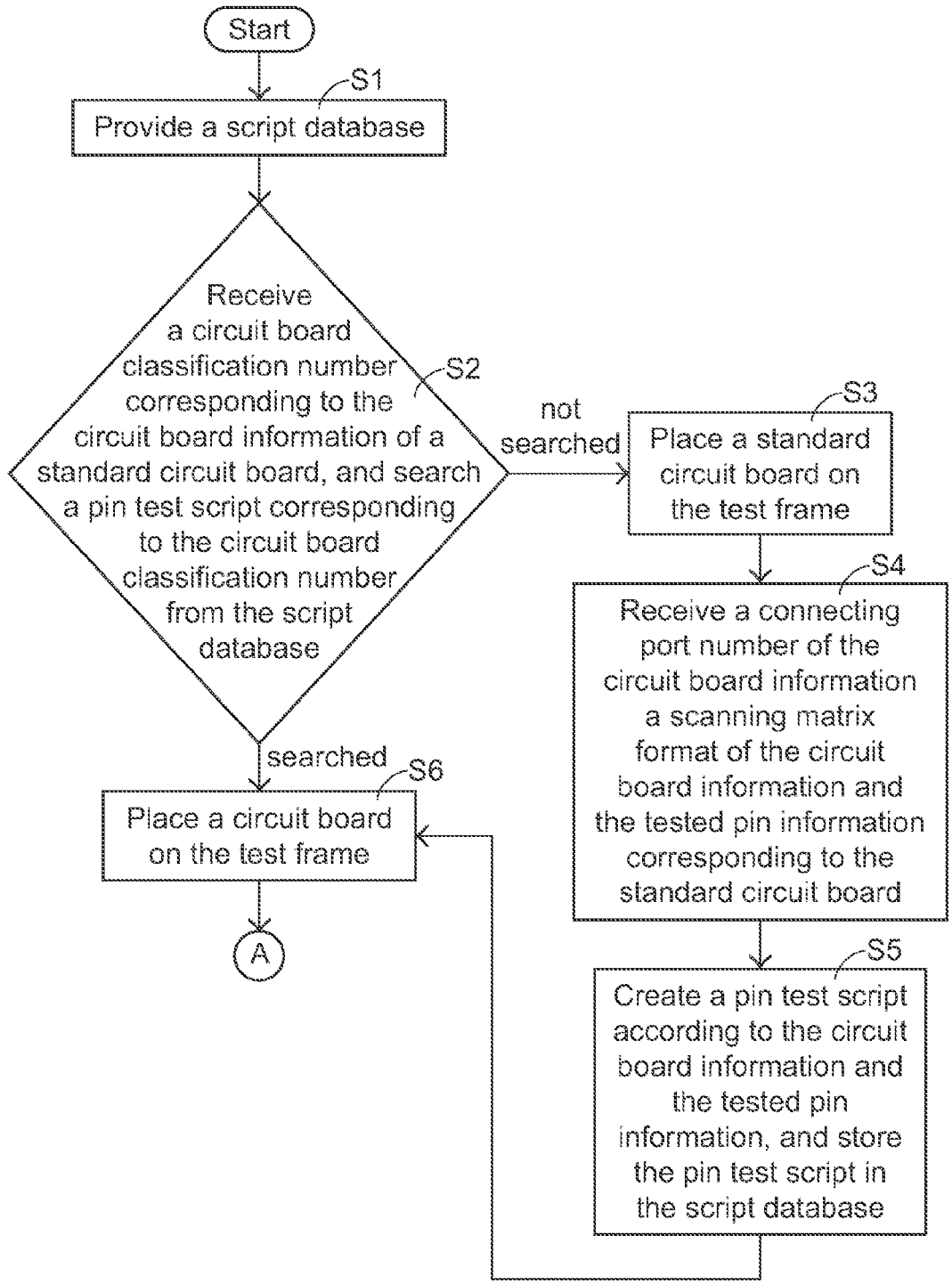
FIGS. 3A and 3B are flowcharts illustrating a circuit board testing method according to a first embodiment of the present invention.
Figure 3B:
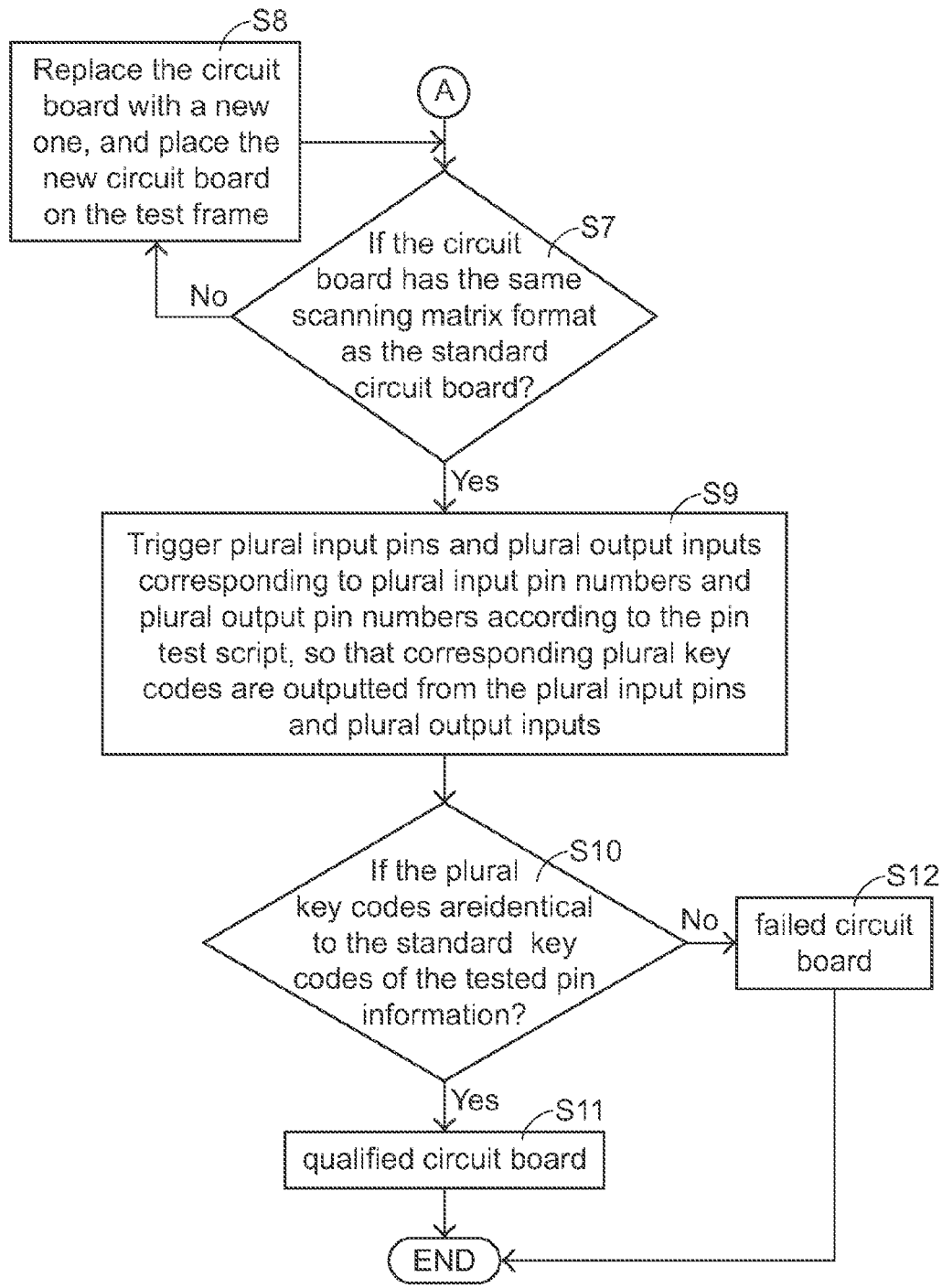

Hereinafter, a circuit board testing method of the present invention will be illustrated with reference to FIGS. 3A and 3B. FIGS. 3A and 3B are flowcharts illustrating a circuit board testing method according to a first embodiment of the present invention. Firstly, in the step S1, a script database is provided. Then, in the step S2, a circuit board classification number corresponding to the circuit board information of a standard circuit board is received, and a pin test script corresponding to the circuit board classification number is searched from the script database. If the pin test script fails to be successfully searched, the step S3 is performed. Whereas, if the pin test script is successfully searched, the step S6 is performed. In the step S3, a standard circuit board is placed on the test frame. In the step S6, a circuit board is placed on the test frame. On the other hand, after the step S3 is done, the step S4 is performed to receive a connecting port number of the circuit board information, a scanning matrix format of the circuit board information and the tested pin information corresponding to the standard circuit board. After the step S4 is done, the step S5 is performed to create a pin test script according to the circuit board information and the tested pin information, and store the pin test script in the script database. After the step S5 is done, the step S6 is performed.

After the step S6 is done, the step S7 is performed to judge whether the circuit board has the same scanning matrix format as the standard circuit board. If the scanning matrix format of the circuit board is different from that of the standard circuit board, the step S8 is performed to replace the circuit board with a new one and place the new circuit board on the test frame. Then, the step S7 is performed again. If the scanning matrix format of the new circuit board is still different from that of the standard circuit board, the steps S7 and S8 are repeatedly performed until the new circuit board has the same scanning matrix format as the standard circuit board. Once the new circuit board has the same scanning matrix format as the standard circuit board, the step S9 is performed.

In the step S9, plural input pins and plural output inputs corresponding to plural input pin numbers and plural output pin numbers are triggered according to the pin test script, so that corresponding plural key codes are outputted from the plural input pins and plural output inputs. Then, the step S10 is performed to judge whether the plural key codes are identical to the standard key codes of the tested pin information. If the plural key codes are identical to the standard key codes, the circuit board is considered as a qualified circuit board able to pass the test (in the step S11). Whereas, if the plural key codes are different from the standard key codes, the circuit board is considered as a failed circuit board unable to pass the test (in the step S12). Meanwhile, the circuit board testing method is ended.

The meanings of the key codes, the standard circuit board, the circuit board information, the pin test script, the tested pin information, the standard key codes, the scanning matrix format and the script database will be described in more details as follows. The scanning matrix format denotes the format of the scanning matrix of keys of the input device (e.g. 8×18, 8×16 or 8×17). That is, the scanning matrix format is related to the amount of the scan input lines and the amount of the scan output lines. The key codes are related to the plural keys of the input device. The plural keys correspond to plural key intersections of the scanning matrix of keys. In addition, each key intersection is defined by a scan input line and a scan output line. For example, when a key A of the keyboard is pressed, the key intersection corresponding to the key A is triggered, and the scan input line and the scan output line corresponding to the key intersection are also triggered. Consequently, a code corresponding to the triggered key intersection is generated. After the code is received by the computer which is connected with the keyboard, the computer may realize that the triggered scan input line and the triggered scan output line correspond to the key A. That is, the code is a key code. In this embodiment, the key code is a scan code. The standard circuit board denotes the circuit board which has been previously determined as a qualified circuit board with normal functions by a standard testing procedure. The standard key codes denote the codes outputted from the triggered scan input lines and the triggered scan output lines of the standard circuit board. In a preferred embodiment, the circuit board is installed in an input device with a PS2 (Personal System/2) interface. Correspondingly, the circuit board information comprises a circuit board classification number, a connecting port number and a scanning matrix format. The circuit board classification number is classified according to the scanning matrix format of the circuit board. For example, the circuit board connected with the 8×18 scanning matrix has a first type of circuit board classification number; and the circuit board connected with the 8×16 scanning matrix has a second type of circuit board classification number. That is, every type of circuit board has a corresponding circuit board classification number.

In a preferred embodiment, the tested pin information comprises plural input pin numbers and plural output pin numbers of the to-be-tested pins and plural standard key codes corresponding to the plural input pin numbers and plural output pin numbers. The pin test script comprises the above-mentioned circuit board information and the above-mentioned tested pin information. The script database is used for storing the above-mentioned pin test script.

Figure 4:
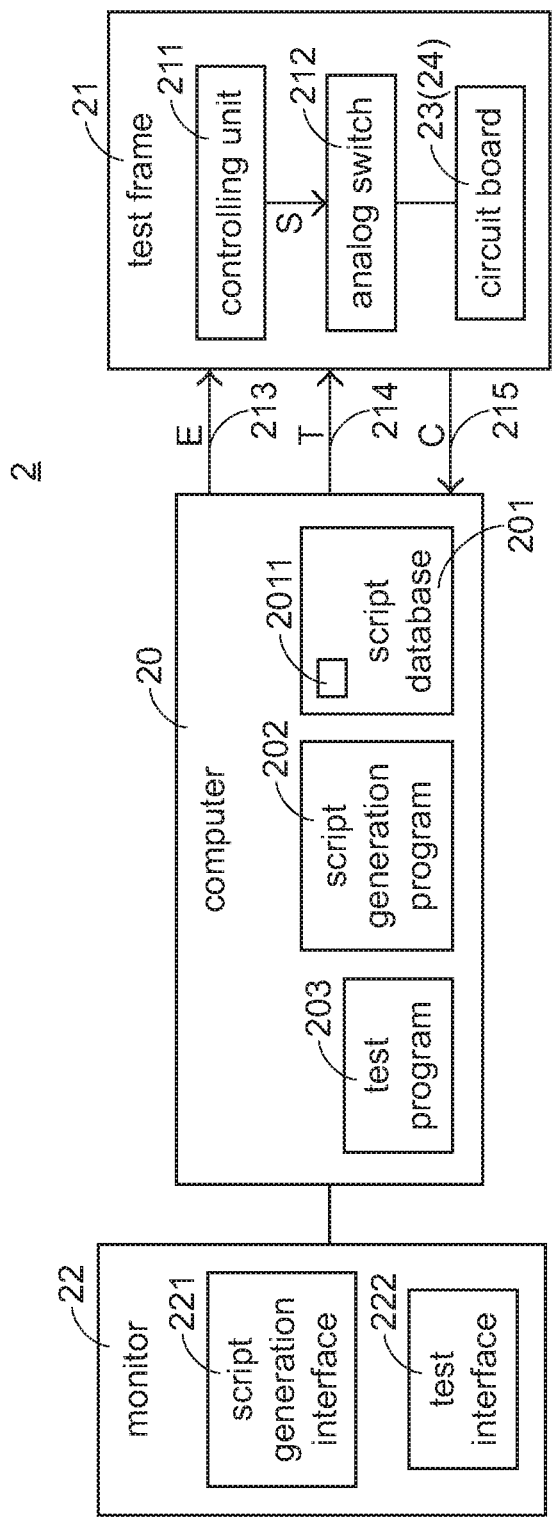
FIG. 4 is a schematic functional block diagram illustrating a circuit board testing system according to a first embodiment of the present invention.

Hereinafter, a circuit board testing system of the present invention will be illustrated with reference to FIG. 4. FIG. 4 is a schematic functional block diagram illustrating a circuit board testing system according to a first embodiment of the present invention. As shown in FIG. 4, the circuit board testing system 2 comprises a computer 20, a test frame 21 and a monitor 22. The test frame 21 and the monitor 22 are respectively connected with the computer 20. The test frame 21 is used to support a circuit board 23 and test the circuit board 23. In a preferred embodiment, the circuit board 23 may be installed in an input device with a PS2 (Personal System/2) interface. For example, such input device is a keyboard, a mouse or a trackball.

The computer 20 comprises a script database 201, a script generation program 202 and a test program 203. The script database 201 is stored in the computer 20. The script generation program 202 is installed in the computer 20 for generating a pin test script 2011, which is stored in the script database 201. The test program 203 is also installed in the computer 20. According to the pin test script 2011, the test program 203 may generate a test signal T corresponding to the pin test script 2011. Consequently, the circuit board 23 is tested according to the test signal T.

Please refer to FIG. 4 again. The monitor 22 is connected with the computer system 20 for showing a script generation interface 221 of the script generation program 202 and a test interface 222 of the test program 203. The test frame 21 comprises a controlling unit 211, an analog switch 212, a power wire 213, a first signal wire 214 and a second signal wire 215. The test frame 21 is connected with the computer 20 through the power wire 213, the first signal wire 214 and the second signal wire 215. Through the power wire 213, electricity E may be transmitted from the computer 20 to the test frame 21. Through the first signal wire 214, the test signal T may be transmitted from the computer 20 to the test frame 21. Through the second signal wire 215, plural key codes C may be transmitted from the test frame 21 to the test program 203 of the computer 20. It is noted that numerous modifications and alterations of the connection member may be made while retaining the teachings of the invention. For example, in some embodiments, the power wire 213 is connected with another power source rather than the computer. Alternatively, in some embodiments, the test frame has a built-in power source without the need of using the power wire. Moreover, the controlling unit 211 is connected with the analog switch 212. The analog switch 212 is further connected with the circuit board 23.

Figure 5A:
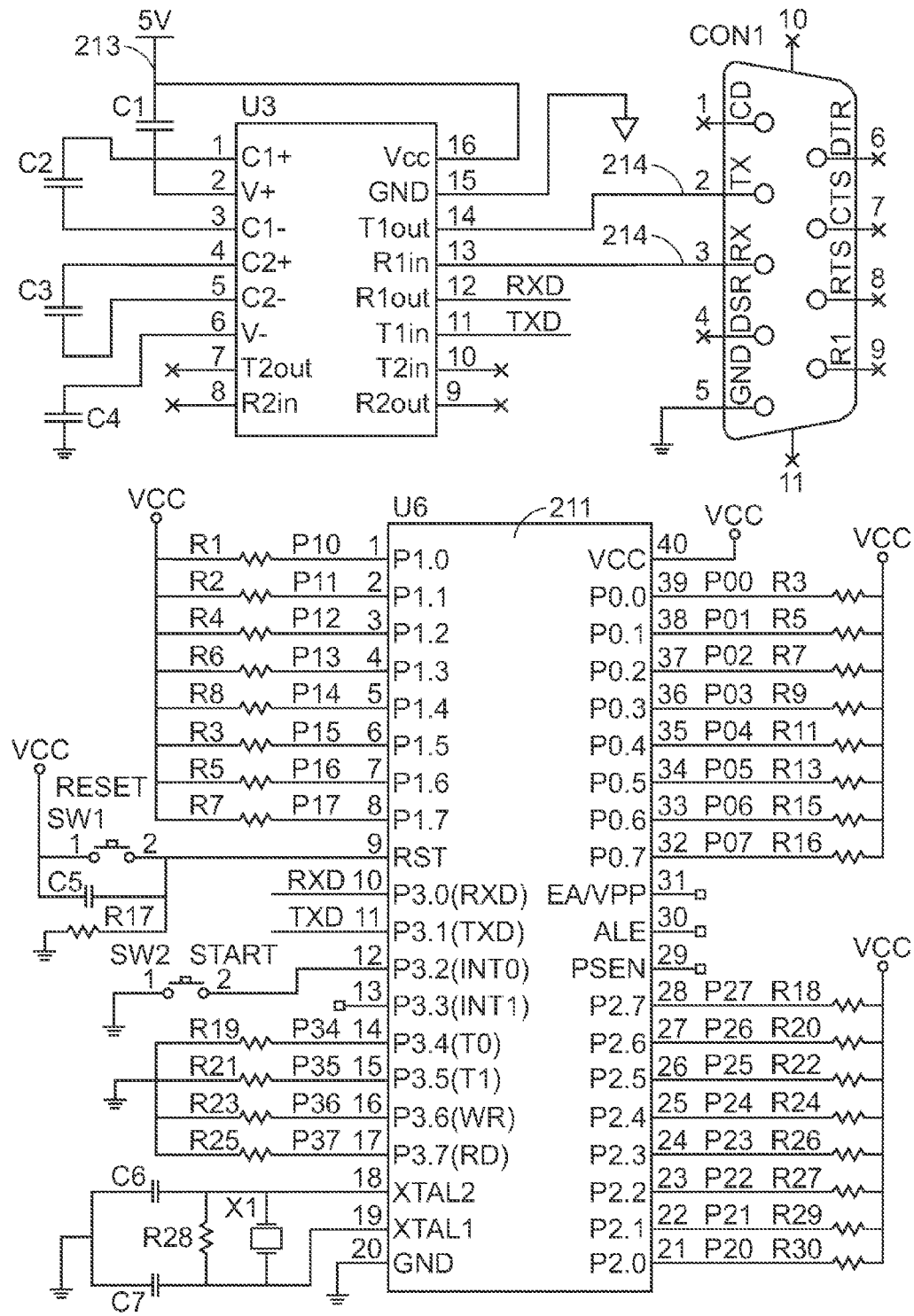
FIGS. 5A and 5B are schematic circuit diagrams illustrating the internal circuitry of the test frame of the circuit board testing system according to the first embodiment of the present invention.
Figure 5B:
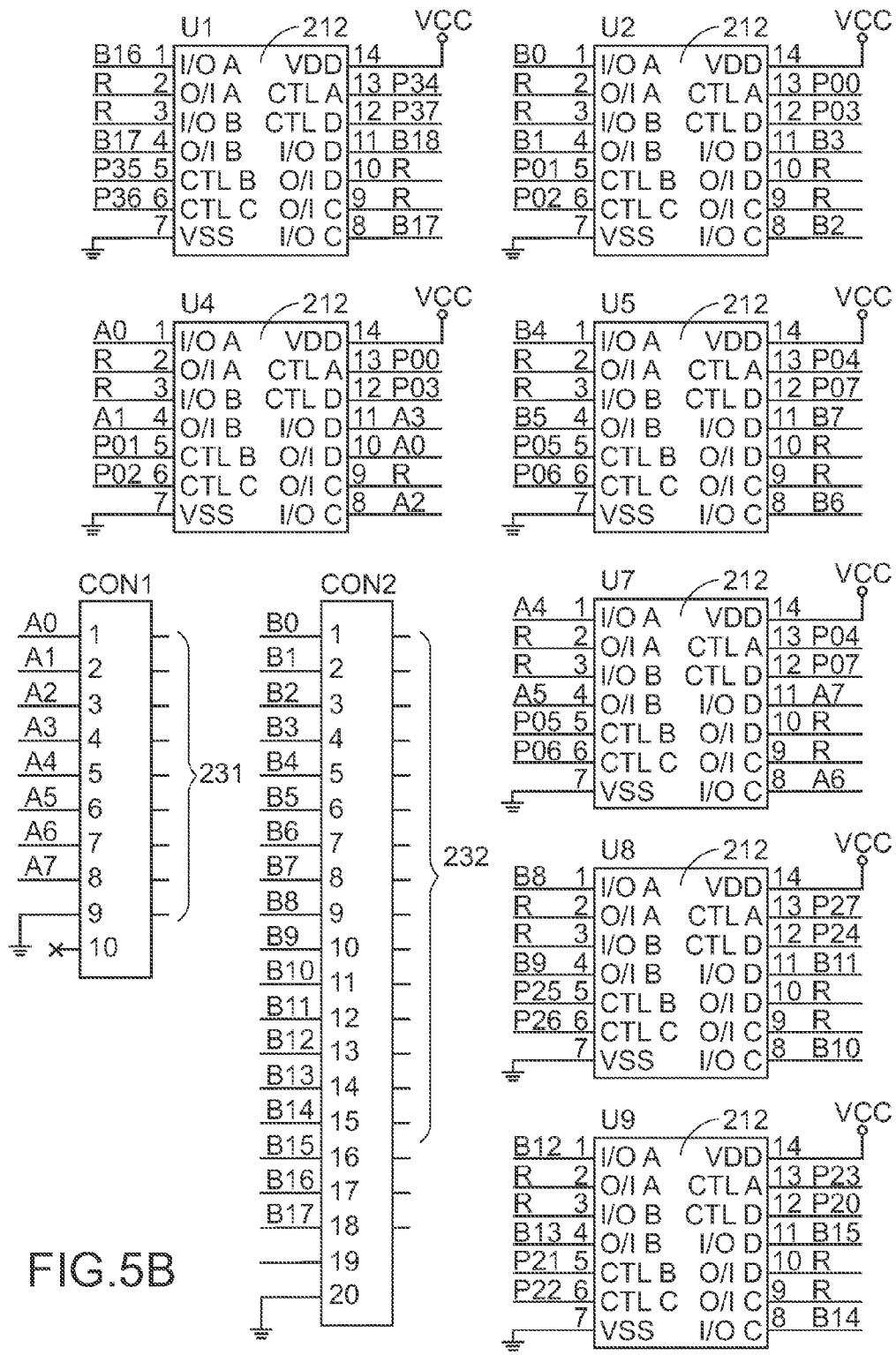

FIGS. 5A and 5B are schematic circuit diagrams illustrating the internal circuitry of the test frame of the circuit board testing system according to the first embodiment of the present invention. The test frame 21 is connected with the computer 20 through the first signal wire 214 and the second signal wire 215. In this embodiment, as shown in FIG. 5A, the first signal wire 214 is a RS232 connecting wire, and the power wire 213 and the second signal wire 215 are USB (universal serial bus) connecting wires. As shown in FIGS. 5A and 5B, the connecting unit 211 is connected with plural analog switches 212. In addition, the plural analog switches 212 are connected with plural input pins A0~A7 and plural output pins B0~B17. Examples of the analog switches 212 include but are not limited to CD4066 switches.

Hereinafter, the script generation interface 221 of the script generation program 202 will be illustrated with reference to FIGS. 6A and 6B. FIGS. 6A and 6B schematically illustrate the contents of the script generation interface of the circuit board testing system according to the first embodiment of the present invention. After the script generation program 202 is activated, the script generation interface 221 is shown on the monitor 22. The script generation interface 221 comprises a circuit board information field 2211, a connecting port setting field 2212, a tested pin setting field 2213 and a file-saving selective item 2214. The circuit board information field 2211 is used to receive a circuit board classification number. The connecting port setting field 2212 comprises a connecting port select field 2212A and a scanning matrix format field 2212B. The connecting port select field 2212A is used to receive a connecting port number. The scanning matrix format field 2212B is used to receive the scanning matrix format of a standard circuit board 24. The tested pin setting field 2213 is used to receive the input pin number and the output pin number of the standard circuit board 24. By clicking the file-saving selective item 2214, the pin test script 2011 is saved in the script database 201.

Figure 7A:
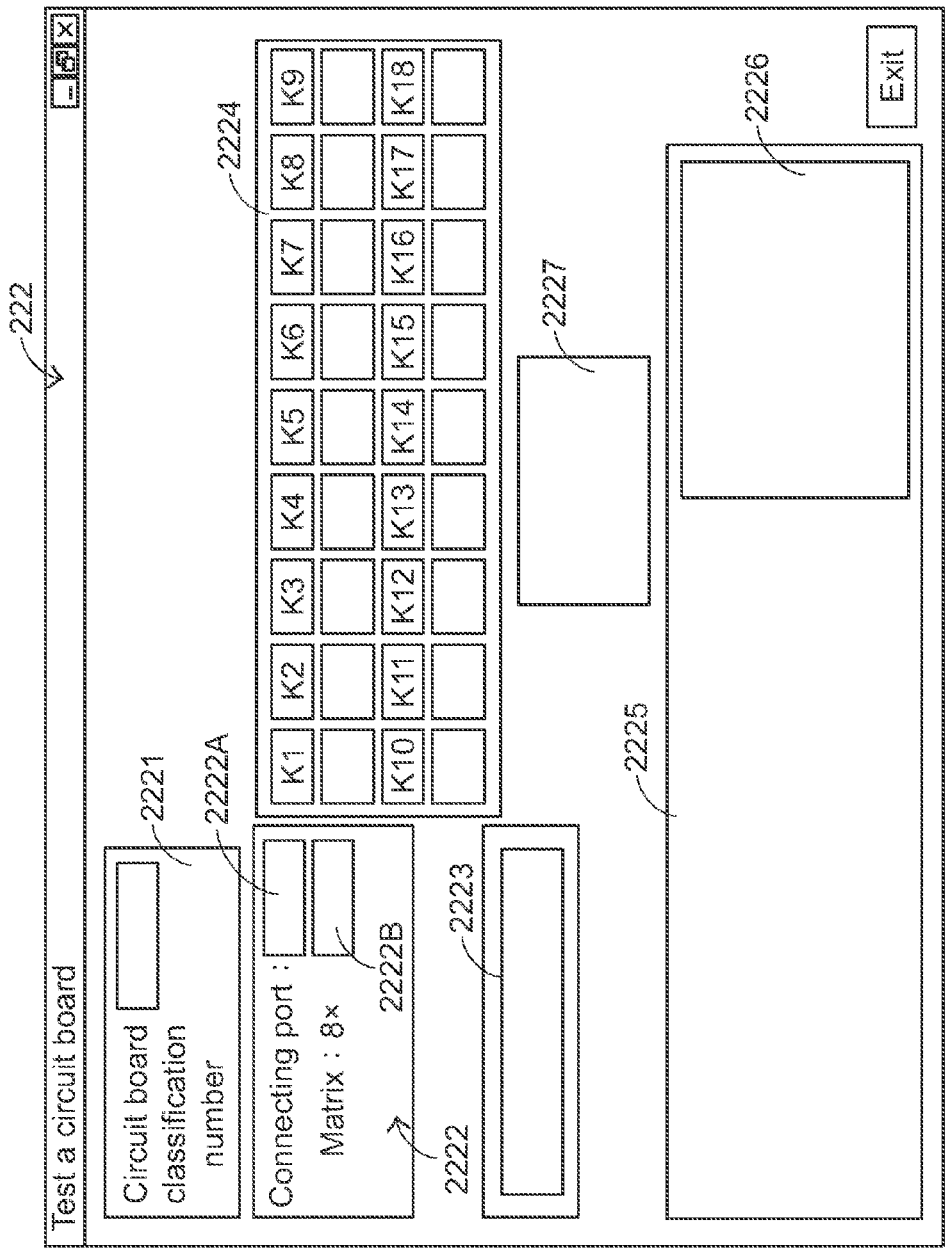

FIG. 7A schematically illustrates the contents of the test interface of the circuit board testing system according to the first embodiment of the present invention. After the test program 203 is activated, the test interface 222 is shown on the monitor 22. The test interface 222 comprises a test circuit board information field 2221, a test connecting port field 2222, a searching field 2223, a tested intersection field 2224, a test intersection amount field 2225, a test display field 2226 and a test status field 2227. The functions of the test circuit board information field 2221 and the test connecting port field 2222 are similar to those of the circuit board information field 2211 and the connecting port setting field 2212 of the script generation interface 221. The test circuit board information field 2221 is used to receive a circuit board classification number. Consequently, the pin test script 2011 corresponding to the circuit board classification number is searched from the script database 201. The test connecting port field 2222 comprises a test connecting port field 2222A and a test scanning matrix format field 2222B. The test connecting port field 2222A is used to receive a test connecting port number. The test scanning matrix format field 2222B is used to receive the scanning matrix format of the tested circuit board 23.

The searching field 2223 is used to indicate whether the tested circuit board 23 has the same scanning matrix format as the standard circuit board 24. The tested intersection field 2224 is used to indicate whether the test intersection has been tested. The test intersection amount field 2225 is used to indicate the total intersection amount, the tested intersection amount, the untested intersection amount, the tested circuit board amount, the total acceptance amount, the total defective amount and the yield. The test display field 2226 is used to indicate the intersection date. The test status field 2227 is used to indicate the test result of the circuit board 23.

Figure 7B:
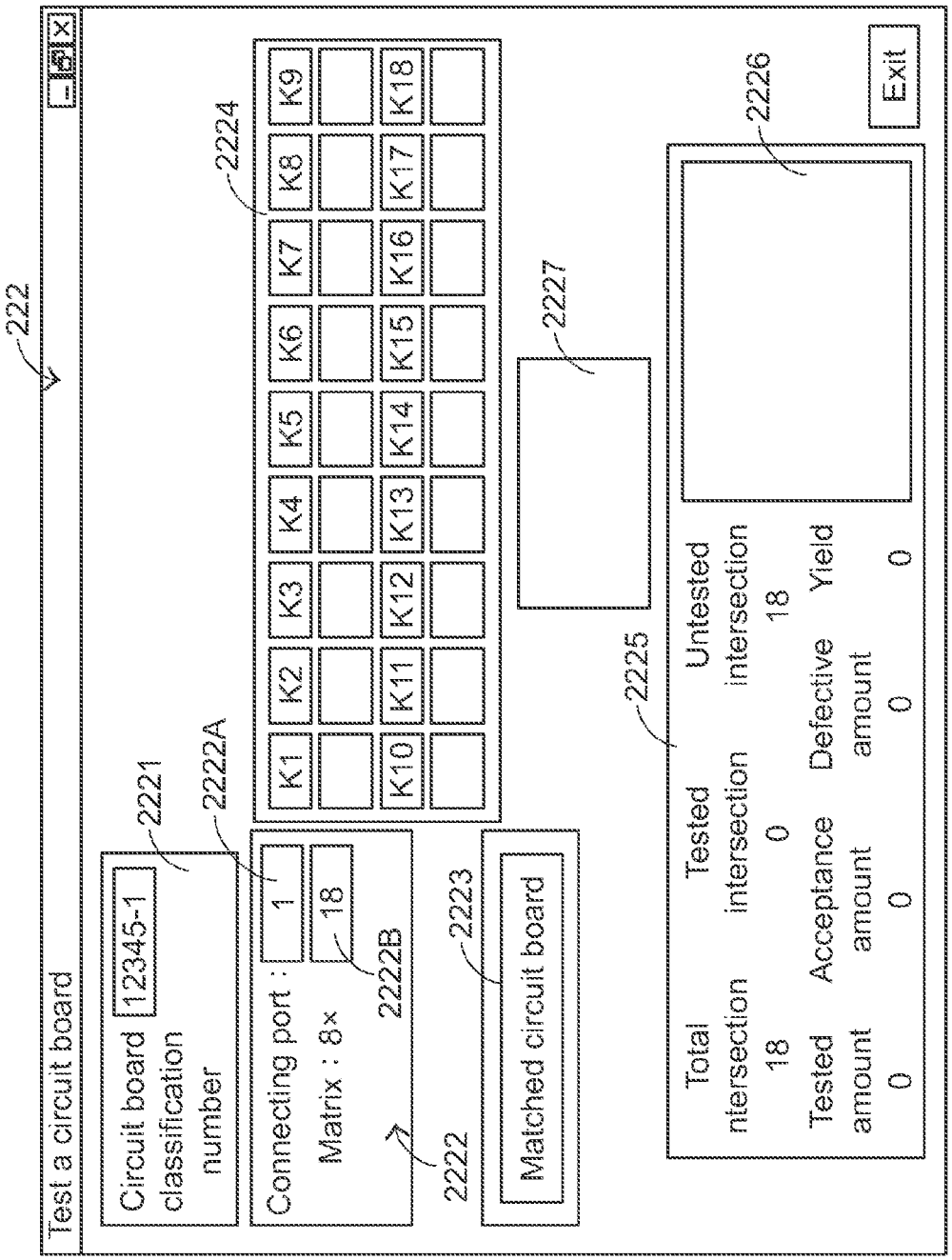

The operations of the circuit board testing system 2 of the present invention will be illustrated in more details as follows. As shown in FIG. 4, when the circuit board testing system 2 is used to test the circuit board 23, a script database 201 is provided, and the script database 201 is stored in the computer 20 (see the step S1). The script database 201 comprises pin test scripts applied to various kinds of circuit boards. Then, the test program 203 of the computer 20 is activated, so that the test interface 222 of the test program 203 is shown on the monitor 22 (see FIG. 7A). Then, a circuit board classification number "12345-1" is received by the test circuit board information field 2221 of the test interface 222 (see FIG. 7B). According to the circuit board classification number, the test program 203 will search the pin test script 2011 corresponding to the circuit board classification number from the script database 201 (see the step S2). If the pin test script 2011 corresponding to the circuit board classification number is not searched from the script database 201 by the test program 203, a standard circuit board 24 having the same scanning matrix format as the circuit board 23 is placed on the test frame 2011 to be tested. At the same time, the script generation program 202 of computer 20 is activated, so that a script generation interface 221 of the script generation program 202 is shown on the monitor 22 (see the Step S3 and FIG. 6A).

Next, the circuit board classification number corresponding to the standard circuit board is received by the circuit board information field 2211 of the script generation interface 221. The circuit board classification number of the standard circuit board is the same as the circuit board classification number "12345-1" of the tested circuit board. That is, the circuit board classification number of the standard circuit board is "12345-1". Then, the connecting port number of the connecting port (i.e. the first signal wire 214) connected with the test frame 21 and the scanning matrix format of the standard circuit board 24 are respectively received by the connecting port select field 2212A and the scanning matrix format field 2212B of the connecting port setting field 2212. In this embodiment, since the first signal wire 214 is connected with a first connecting port of the computer 20, the connecting port number of the first connecting port received by the connecting port select field 2212A is 1. Alternatively, in some embodiments, the first signal wire 214 may be connected with a second connecting port of the computer 20, and thus the connecting port number received by the connecting port select field 2212A is 2. In this embodiment, since the scanning matrix of the standard circuit board is 8×18, a number "18" is received by the scanning matrix format field 2212B.

Next, the input pin numbers and the output pin numbers of the standard circuit board are successively received by the tested pin setting field 2213 of the script generation interface 221. The tested pin setting field 2213 comprises an output pin field 2213A and an input pin field 2213B. The output pin numbers B0, B1, B2, B3, B4, B5, B6, B7, B8, B9, B10, B11, B12, B13, B14, B15, B16 and B17 are successively received by the output pin field 2213A; and the input pin numbers A7, A6, A5, A4, A3, A2, A1, A0, A7, A6, A5, A4, A3, A2, A1, A0, A7 and A6 are successively received by the input pin field 2213B (see FIG. 6B).

Moreover, each input pin and each output pin collectively define a key intersection of the key scanning matrix. As shown in FIG. 6B, the input pin A7 and the output pin B0 collectively define the key intersection K1, the input pin A6 and the output pin B1 collectively define the key intersection K2, . . . , the input pin A6 and the output pin B17 collectively define the key intersection K18. After the input pin numbers and the output pin numbers are received, according to the input pin numbers and the output pin numbers, the input pins (not shown) and the output pins (not shown) of the standard circuit board 24 corresponding to these pin numbers are triggered by the test frame 22. Consequently, corresponding standard key codes are generated and received by the script generation program 202. The circuit board classification number, the connecting port number and the scanning matrix format belong to the circuit board information. The input pin numbers, the output pin numbers and the standard key codes belong to the tested pin information. The above procedures of receiving the circuit board classification number, the connecting port number, the scanning matrix format, the input pin numbers, the output pin numbers and the standard key codes are included in the step S4.

After the circuit board information and the tested pin information corresponding to the standard circuit board 24 are received by the script generation program 202, a pin test script 2011 is created according to the circuit board information and the tested pin information. Moreover, by clicking the file-saving selective item 2214 of the script generation interface 221, the pin test script 2011 will be stored in the script database 201.

After the pin test script 2011 is created, the circuit board 23 is placed on the test frame 21 (see the step S6). Likewise, if the pin test script 2011 is successfully searched in the step S2, the step S6 is also performed to place the circuit board 23 on the test frame 21. Meanwhile, a test connecting port number "1" and a scanning matrix format "18" of the tested circuit board are respectively received by the test connecting port field 2222A and the test scanning matrix format field 2222B of the test interface 222 (see FIG. 7B). After the circuit board 23 is placed on the test frame 21, the test program 203 judges whether the circuit board 23 has the same scanning matrix format the standard circuit board 24 (in the step S7). If the scanning matrix format of the circuit board 23 is different from that of the standard circuit board 24, the step S8 is performed to replace the circuit board 23 with a new one and place the new circuit board on the test frame 21. Then, the step S7 is performed to judge whether the new circuit board 23 has the same scanning matrix format the standard circuit board 24. If the scanning matrix format of the new circuit board is still different from that of the standard circuit board 24, the steps S7 and S8 are repeatedly performed until the new circuit board 23 placed on the test frame 21 has the same scanning matrix format as the standard circuit board 24. Once the test program 203 judges that the circuit board 23 has the same scanning matrix format as the standard circuit board 24, a message "Matched circuit board" is shown in the searching field 2223 to indicate that the circuit board is matched (see FIG. 7B).

Next, according to the pin test script 2011, the test program 203 generates a test signal T corresponding to the pin test script 2011 to the controlling unit 211 of the test frame 21. The test signal T comprises plural input pin numbers and plural output pin numbers of the tested pins. After the test signal T is received, a simulating key signal S is issued from the controlling unit 211 to the plural analog switches 212. Consequently, the plural input pins 231 and the plural output pins 232 corresponding to the simulating key signal S (i.e. the plural input pin numbers and the plural output pin numbers) are triggered. In such way, the plural input pins 231 and the plural output pins 232 generate corresponding plural key codes C (see the step S9). Through the second signal wire 215, the plural key codes C are transmitted to the test program 203 of the computer 20. Then, the test program 203 judges whether the plural key codes C are identical to the standard key codes of the tested pin information. Meanwhile, the contents of the tested intersection field 2224 are changed to indicate whether the key intersections K1~K18 have been tested or not (i.e. whether the input pins 231 and the output pins 232 are triggered). In addition, the contents of the test intersection amount field 2225 are changed according to the test result (i.e. the result of comparing the plural key codes C with the standard key codes). The intersection data associated with the triggered input pin 231 and the triggered output pin 232 are shown in the test display field 2226.

Please refer to FIG. 7C. After the key intersection K1 corresponding to the input pin number A7 and the output pin number B0 is has been tested, the region of the tested intersection field 2224 corresponding to the key intersection K1 is marked with a first color (e.g. a green color). If the key code C outputted from the input pin 231 and the output pin 232 corresponding to the key intersection K1 is identical to the standard key code, as shown in the test intersection amount field 2225, the total intersection amount is 18; the tested intersection amount is changed from 0 (see FIG. 7B) to 1; the untested intersection amount is changed from 18 (see FIG. 7B) to 17; and the tested circuit board amount, the total acceptance amount, the total defective amount and the yield are all 0. In addition, the intersection data corresponding to the key intersection K1 are shown in the test display field 2226. For example, the intersection data includes "19 KeyDown 69" and "19 KeyUp 69". In "19 KeyDown 69", "19" denotes the intersection number, "60" denotes the key code, and "KeyDown" denotes that the intersection is triggered. Similarly, in "KeyUp" denotes that the intersection is not triggered. The successive intersection data "KeyDown" and "KeyUp" may avoid the similar condition of continuously pressing a key because the intersection is not continuously triggered after being triggered.

Figure 7D:
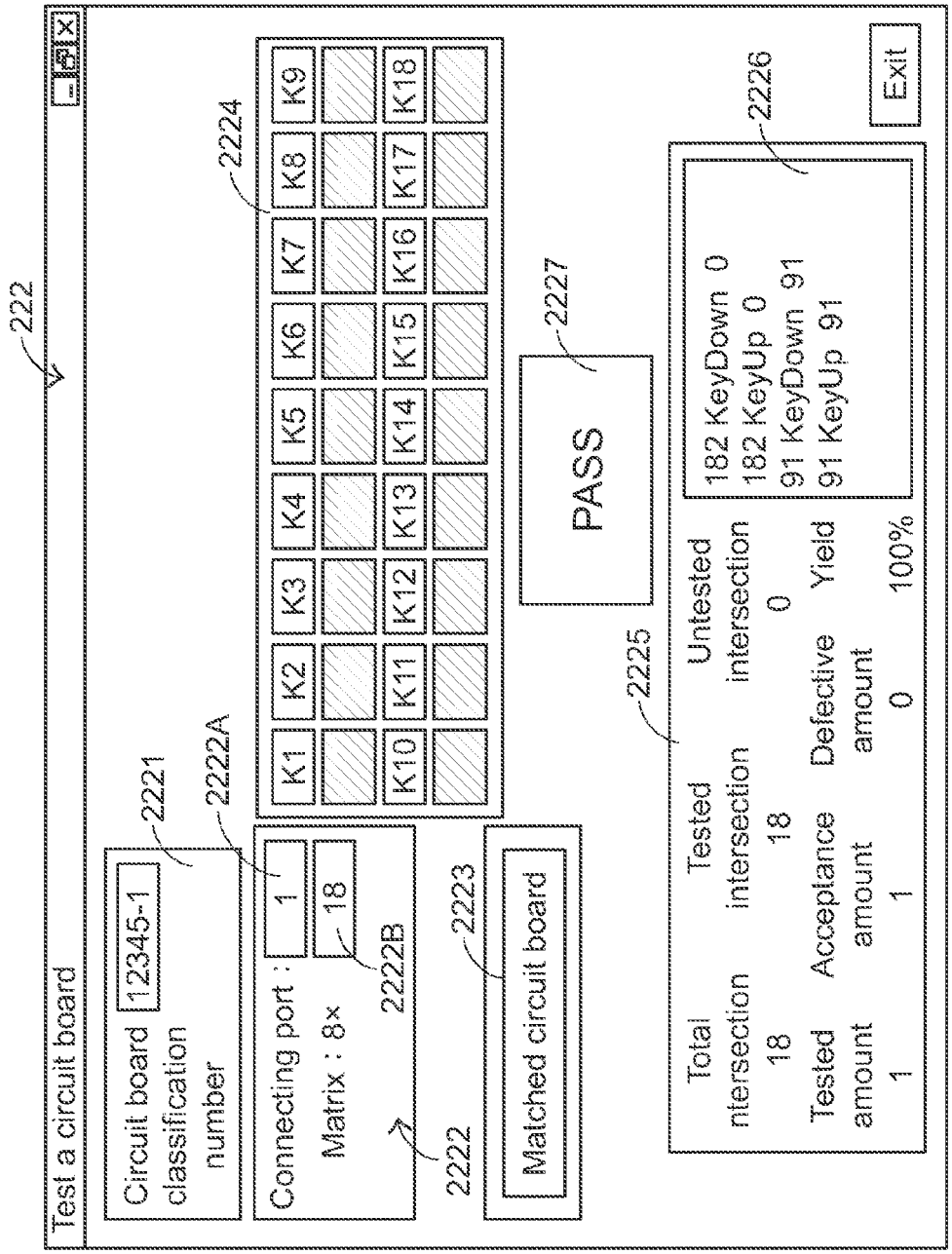

After all of the key intersections K1~K18 are triggered, if all of the key codes C are identical to the standard key codes, the test program 203 judges that the circuit board is a qualified circuit board able to pass the test (see the step S11). Meanwhile, all regions of the tested intersection field 2224 of the test interface 222 are marked with the first color (e.g. the green color), and a message "PASS" is shown in the test status field 2227. As shown in the test intersection amount field 2225, the total intersection amount is 18; the tested intersection amount is 18; the untested intersection amount is 0; the tested circuit board amount is 1; the total acceptance amount is 1; the total defective amount is 0; and the yield is 100% (see FIG. 7D). Meanwhile, the process of testing the circuit board 23 is finished.

Figure 7E:
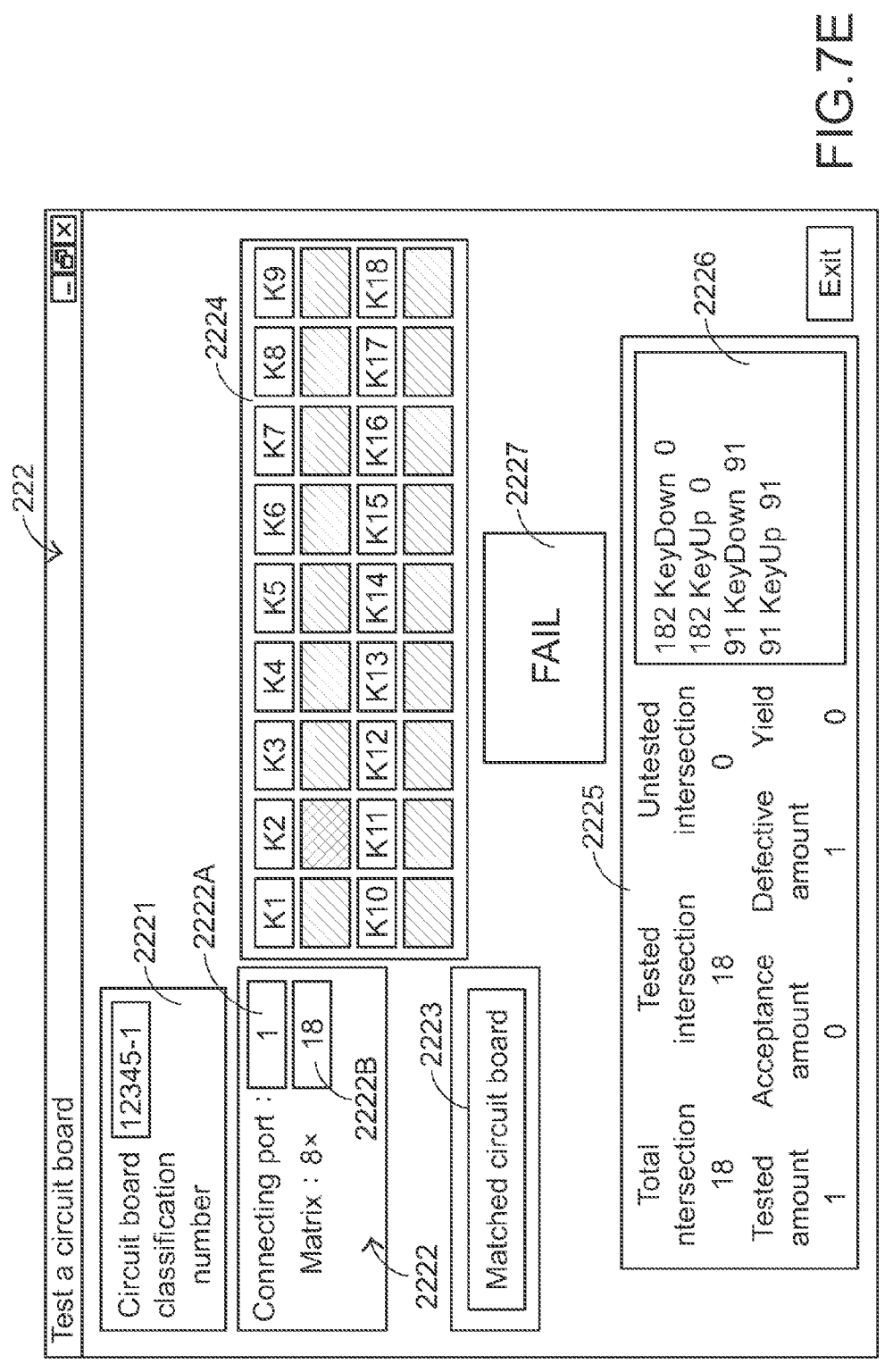

After all of the key intersections K1~K18 are triggered, if most of the key codes are identical to the standard key codes but some of the key codes are different from the standard key codes, the test program 203 judges that the circuit board is a failed circuit board unable to pass the test (see the step S12). For example, as shown in FIG. 7E, the key code corresponding to the key intersection K2 is different from the standard key code. In this situation, the regions of the tested intersection field 2224 of the test interface 222 corresponding to the key intersections K1 and K3-K18 are marked with the first color (e.g. the green color), but the region of the tested intersection field 2224 corresponding to the key intersection K2 is marked with a second color (e.g. a red color). At the same time, a message "FAIL" is shown in the test status field 2227. As shown in the test intersection amount field 2225, the total intersection amount is changed from 18; the tested intersection amount is 18; the untested intersection amount is 0; the tested circuit board amount is 1; the total acceptance amount is 0; the total defective amount is 1; and the yield is 0% (see FIG. 7E). Meanwhile, the process of testing the circuit board 23 is finished.

It is noted that other circuit boards with the same scanning matrix format as the standard circuit board may be tested by the circuit board testing system 2 of the present invention. The test results of these circuit boards are also shown in the test intersection amount field 2225, and then the yields of these circuit boards are calculated.

In the first embodiment, the circuit board testing system and the circuit board testing method are configured to test the circuit boards with the PS2 (Personal System/2) interfaces. In a second embodiment of the present invention, the circuit board testing system and the circuit board testing method are configured to test the circuit boards with USB (universal series bus) interfaces.

The circuit board testing method of the second embodiment is substantially identical to that of the first embodiment except for the contents of the circuit board information. In addition to the circuit board classification number, the connecting port number and the scanning matrix format, the circuit board information further comprises a product ID (PID), a vendor ID (VID) and an input device classification number. The product ID, the vendor ID and the input device classification number are identification codes specially used in the USB-interface input device.

Figure 8:
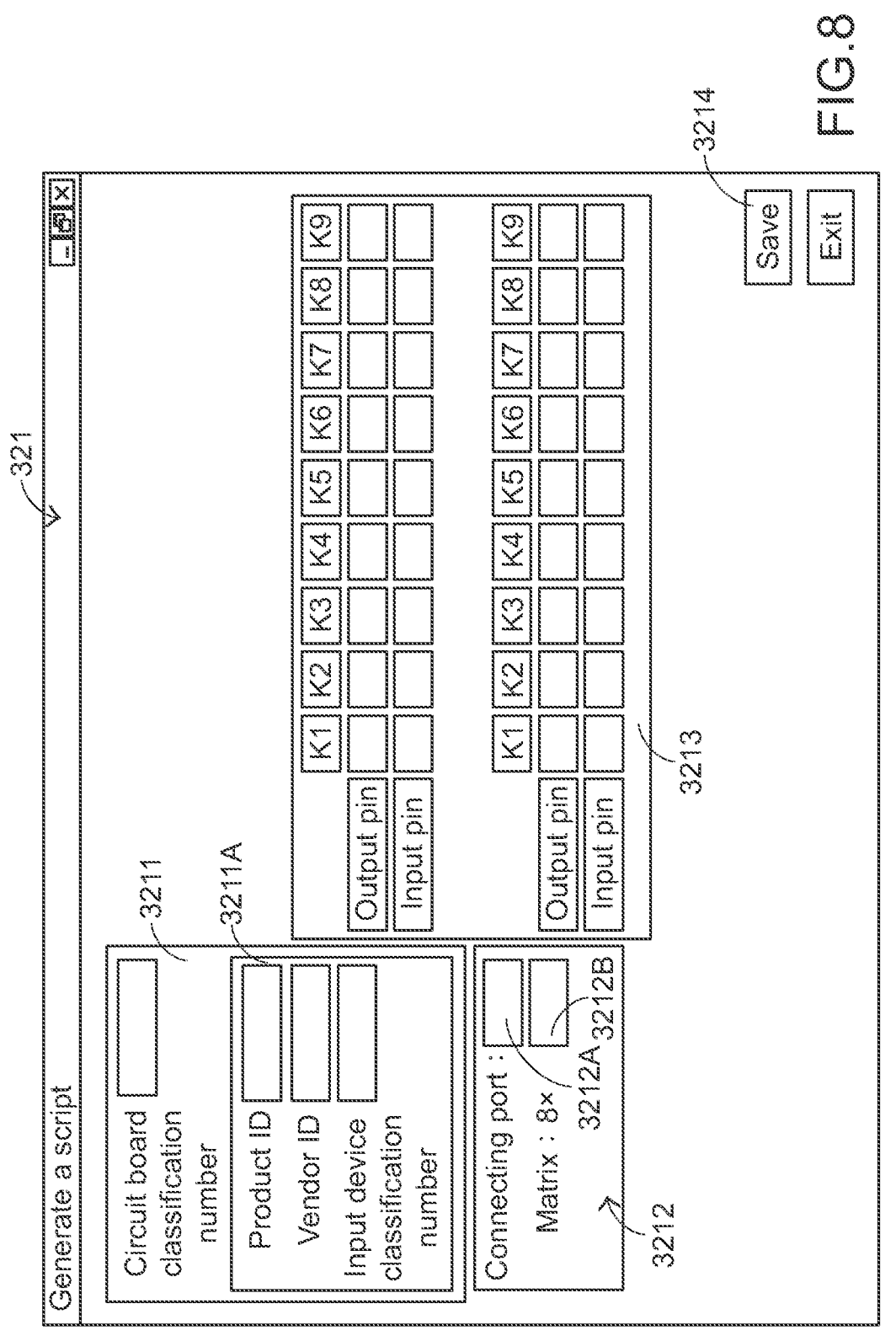

Since the circuit board information for the USB-interface input device is different, the script generation interface of the circuit board testing system is distinguished. FIG. 8 schematically illustrates the script generation interface of the circuit board testing system according to the second embodiment of the present invention. Like the first embodiment, the script generation interface 321 of the second embodiment also comprises a circuit board information field 3211, a connecting port setting field 3212, a tested pin setting field 3213 and a file-saving selective item 3214. Whereas, the circuit board information field 3211 further comprises a USB information field 3211A for receiving the product ID, the vendor ID and the input device classification number of the circuit board. The circuit board testing system and the circuit board testing method for testing the USB-interface circuit board are similar to those of the first embodiment, and are not redundantly described herein.

In the above two embodiments, the circuit board testing method and the circuit board testing system of the present invention utilize a pin test script of a script database to test the circuit board. In a case that the script database has no pin test script corresponding to the tested circuit board, a new pin test script specially used in the tested circuit board is created and stored in the script database. From now on, when the operator wants to test the same type of circuit board, the corresponding pin test script may be searched from the script database to test to circuit board. That is, the circuit board testing method and the circuit board testing system of the present invention may be applied to various circuit boards with different scanning matrix formats without being restricted to some specific formats of circuit boards.

Moreover, according to the circuit board testing method and the circuit board testing system of the present invention, the pin settings of the input pins and the output pins of the circuit board may be defined through the script generation interface during the process of creating the pin test script. In other words, the circuit board testing method and the circuit board testing system of the present invention may be applied to various circuit boards with different pin settings without the need of rewriting or modifying the pin test script. As a consequence, the time period of editing the pin test script is saved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circuit board testing method for testing a circuit board of keys, said circuit board comprising plural input pins and plural output pins, said circuit board issuing a key code corresponding to a triggered input pin and a triggered output pin, said circuit board testing method comprising steps of:
providing a script database;
receiving a circuit board information corresponding to a standard circuit board, and searching a pin test script corresponding to said circuit board information from said script database, wherein if said pin test script is not successfully searched, a tested pin information corresponding to said standard circuit board is received, and said pin test script is generated according to said circuit board information and said tested pin information; and testing said plural input pins and said plural output pins of said circuit board corresponding to said tested pin information according to said pin test script.

2. The circuit board testing method according to claim 1 wherein said step of testing said plural input pins and said plural output pins of said circuit board corresponding to said tested pin information comprises sub-steps of:

triggering said plural input pins and said plural output pins according to plural input pin numbers and plural output pin numbers of said tested pin information, so that plural key codes are correspondingly outputted from said plural input pins and said plural output pins; and judging whether said plural key codes are the same as corresponding standard key codes of said tested pin information.

3. The circuit board testing method according to claim 2 wherein if said plural key codes are different from said plural standard key codes, said circuit board is considered as a failed circuit board, wherein if said plural key codes are identical to said plural standard key codes, said circuit board is considered as a qualified circuit board.

4. The circuit board testing method according to claim 1 wherein said circuit board information comprises a circuit board classification number, a connecting port number and a scanning matrix format, wherein said key code is a scan code, wherein said circuit board is installed in an input device with a PS2 (Personal System/2) interface, and said input device is a keyboard, a mouse or a trackball.

5. The circuit board testing method according to claim 1 wherein said pin test script is searched from said script database according to a circuit board classification number of said circuit board information, and said script database is stored in a computer.

6. The circuit board testing method according to claim 1 wherein if said pin test script is not successfully searched, said circuit board testing method further comprises a step of receiving a connecting port number and a scanning matrix format of said circuit board information.

7. A circuit board testing system for testing a circuit board of keys, said circuit board comprising plural input pins and plural output pins, said circuit board issuing a key code corresponding to said triggered input pin and said triggered output pin, said circuit board testing system comprising:

a computer comprising:
a script database stored in said computer;
a script generation program installed in said computer for generating a pin test script, and storing said pin test script in said script database; and
a test program installed in said computer for generating a test signal corresponding to said pin test script according to said pin test script, thereby testing said circuit board; and a test frame connected with said computer for supporting said circuit board, generating a simulating key signal according to said test signal, and triggering said plural input pins and said plural output pins corresponding to said simulating signal, so that said plural key codes corresponding to said plural input pins and said plural output pins are outputted from said circuit board to said test program of said computer, wherein said test program judges whether said circuit board is a qualified circuit board by comparing said plural key codes with plural standard key codes of said pin test script.

8. The circuit board testing system according to claim 7 wherein said pin test script further comprises a circuit board information and a tested pin information, wherein said tested pin information comprises plural input pin numbers, plural output pin numbers and said plural standard key codes.

9. The circuit board testing system according to claim 8 wherein said circuit board information comprises a circuit board classification number, a connecting port number and a scanning matrix format, and said key code is a scan code, wherein said circuit board is installed in an input device with a PS2 (Personal System/2) interface, and said input device is a keyboard, a mouse or a trackball.

10. The circuit board testing system according to claim 8 wherein said circuit board information comprises a circuit board classification number, a connecting port number, a scanning matrix format, a product ID (PID), a vendor ID (VID) and an input device classification number, wherein said key code is a scan code, wherein said circuit board is installed in an input device with a USB (universal series bus) interface, and said input device is a keyboard, a mouse or a trackball.

11. The circuit board testing system according to claim 7 wherein if said plural key codes are different from said plural standard key codes, said circuit board is considered as a failed circuit board, wherein if said plural key codes are identical to said plural standard key codes, said circuit board is considered as a qualified circuit board.

12. The circuit board testing system according to claim 7 further comprising a monitor, which is connected with said computer for showing a script generation interface of said script generation program and a test interface of said test program, wherein said pin test script is created through said script generation interface.

13. The circuit board testing system according to claim 12 wherein said script generation interface comprises a circuit board information field, a connecting port setting field and a tested pin setting field, and said test interface comprises a test circuit board information field, a test connecting port field, a searching field, a tested intersection field, a test intersection number field, a test display field and a test status field.

14. The circuit board testing system according to claim 7 wherein said test frame comprises:

a controlling unit electrically connected with said circuit board for generating said simulating key signal according to said test signal;

an analog switch electrically connected with said controlling unit and said circuit board for receiving said simulating key signal, and triggering said plural input pins and said plural output pins of said circuit board corresponding to said simulating signal;

a power wire connected with said computer for transmitting electricity from said computer to said test frame;

a first signal wire connected with said computer for transmitting said test signal from said computer to said test frame; and a second signal wire connected with said computer for transmitting said plural key codes to said test program of said computer.

15. The circuit board testing system according to claim 14 wherein said power wire and said second signal wire are USB connecting wires, and said first signal wire is a RS232 connecting wire.

* * * * *